Sept. 26, 1933.  O. E. MARVEL  1,928,108
MOTOR AND MOTOR CONTROL
Filed Jan. 27, 1930
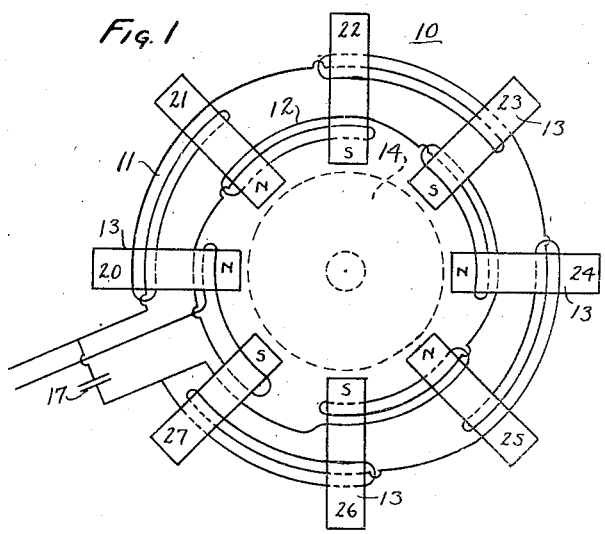
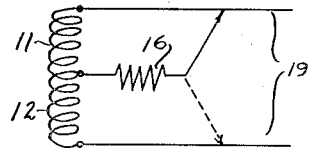
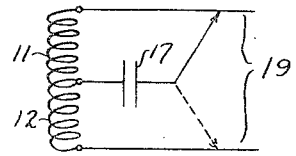
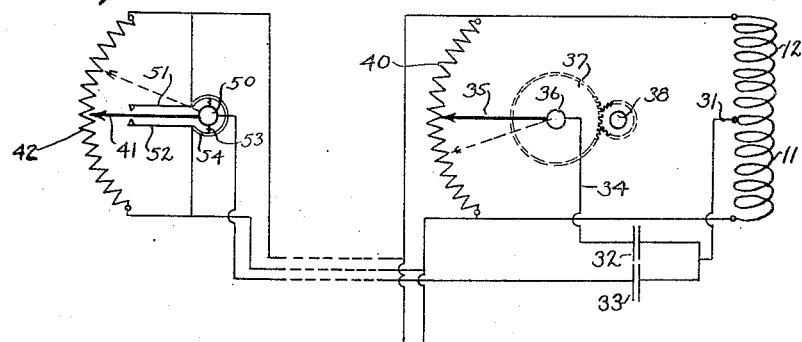
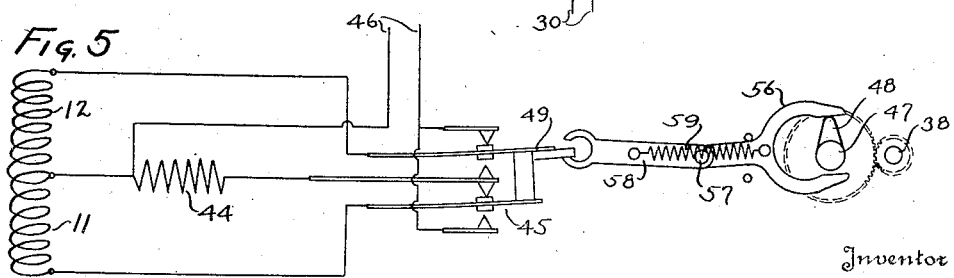
Inventor
Orin E. Marvel
By Maréchal and Noé
Attorneys Patented Sept. 26, 1933

1,928,108

UNITED STATES PATENT OFFICE 1,928,108

MOTOR AND MOTOR CONTROL

Orin E. Marvel, Grand Rapids, Mich.

Application January 27, 1930. Serial No. 423,754

6 Claims. (Cl. 172—278)

This invention relates to alternating current motors and motor controls, with particular reference to motors adapted to operate with high starting torque on single phase alternating current.

One object of the invention is the provision of an alternating current motor of the character mentioned having a plurality of windings and a plurality of pole pieces so arranged that the windings have pole pieces in common, providing a pole system in which a weak pole is arranged adjacent a strong pole of the same polarity with the effective magnetic flux from said poles being substantially 90° out of phase.

Another object of the invention is the provision of a single phase alternating current motor adapted to operate in reverse directions, and having a phase modifier adapted to be quickly connected to effect the phase displacement of either winding.

A further object of the invention is the provision of a motor of the character herein mentioned, having a remote control device of novel construction for controlling the direction of rotation and the operation of the motor.

Other objects and advantages of the invention will be apparent from the following description, the accompanying drawing and the attached claims.

In the drawing:—

Fig. 1 is a diagrammatic representation of an alternating current motor embodying the present invention;

Fig. 2 is a simplified diagrammatic view of the electrical connections;

Fig. 3 is a view similar to Fig. 2 but showing a resistance as a phase modifier, instead of a condenser;

Fig. 4 is a diagrammatic view of the motor controlling apparatus, with the associated motor; and Fig. 5 is a diagrammatic view of the electrical connections of a slightly modified arrangement of electrical connections.

Referring now more particularly to Fig. 1, my invention as shown applies to a single phase squirrel cage induction motor 10, provided with two exciting or field windings 11 and 12 which are arranged on a series of poles 13 of the stator, the usual squirrel cage rotor 14, preferably having a full bar skew, being rotatably mounted in any suitable manner within the pole pieces. A phase modifier, which may be a resistance 16 as indicated in Fig. 3 or a condenser 17 as indicated in Fig. 2, or any other suitable device for attaining a phase displacement in one of the windings is employed, shown as connected at one side thereof to a common connection between the two windings 11 and 12 which are arranged in series across a power supply alternating current line 19 for supplying power at 110 volts or at any other suitable voltage.

The poles 13 comprise the pole pieces 20, 21, 22, 23, 24, 25, 26 and 27, these being preferably of similar size and construction and arranged circumferentially around the rotor at equal angular spacing. As shown there are eight poles, although the number of poles can of course be made any number desired depending upon the speed of operation desired. The two windings of the stator have pole pieces in common, the winding 11 embracing the pole pieces 20 and 21 so as to have the same effect on both of these pole pieces. Let us say that the winding 11 is so arranged on the pole pieces 20 and 21 as to tend to make these of north polarity, at some certain instant. The winding 11 would then be wound about the two pole pieces 22 and 23 so that these would tend to be poles of south polarity so far as the effect of this winding 11 is concerned. Poles 24 and 25 would be wound to make them north poles while poles 26 and 27 would be south poles. The winding 12, like the winding 11, embraces adjacent poles in pairs, but the poles 21 and 22 are now embraced by one portion of the winding 12 and portions 20 and 27 are embraced by another portion, and so on. The winding 12, let us say, tends to make the two poles 21 and 22 north poles at some certain instant, while the winding 11 tends to make these poles north and south respectively. As the current flowing in winding 12 is displaced in phase with relation to the current flowing in winding 11, the effect of the two windings on the various poles is that there are two strong north poles and two strong south poles opposite one another, and between a north and a south pole there is a weak pole, the adjacent weak poles being of opposite polarity, it being understood that where the two windings cooperate in producing any certain pole, that pole would be strongly north while where the two windings buck one another a weak pole would be created. As the currents flowing in the two windings are not equal it will be apparent that the weak poles will have some definite polarity which is substantially 90° displaced in phase from the polarity of the adjacent poles. The arrangement is such that the phase displacement of the magnetic flux is substantially 90° in the two sets of poles, even though the phase displacement in the currents flowing in the two windings is but about 30°. This 90° phase displacement in magnetic flux thus obtained is very advantageous as it permits a motor construction having very high starting torque, and one in which the motor can be very readily made reversible. When there is no phase displacement in the currents flowing in the two windings, that is, if the condenser 17 or resistance 16 is not connected to either side of the line,—due to the symmetrical and balanced arrangement of the windings and poles, the four poles 21, 23, 25 and 27 will be strong while the poles 20, 22, 24 and 26 will have zero magnetic flux and under such conditions the device would act as a magnetic brake. Thus there would be two strong north poles and two strong south poles so positioned at 90° angular spacing that a strong braking effect is produced on the rotor as long as the rotor is in motion and with a force that varies as the speed of rotation.

As shown in Figs. 2 and 3 the phase modifier 16 or 17 is connected to the common connection of the two windings 11 and 12, and the other side of the phase modifier is connected in a suitable manner to a switch so that it may be electrically connected to either side of the line as desired. When it is connected as shown in Fig. 3 for example the current flowing through the winding 12 divides so that part flows through the winding 11 and part through the phase modifier 16, this phase modifier therefore changing the value as well as the phase of the current flowing through the winding 11. If the switch connects the phase modifier 16 to the other side of the line 19, the motor will immediately reverse its direction of rotation. If the switch connected to the phase modifier 16 is opened instead of being connected to either side of the line, the motor will immediately stop, and this stopping takes place almost simultaneously as a braking effect is produced in the windings which effectively prevents almost all over-running of the motor. Quick stopping of the motor is extremely desirable in a reversible motor, as the braking effect that takes place during the time the circuit to the phase modifier is broken can stop the motor before it tends to be started in the other direction when the phase modifier is switched from one side of the line to the other.
The phase modifier 16 or 17 shown in Figs. 2 or 3 may be a resistance, which is of course quite cheap as compared to the cost of a condenser, or may be a condenser, which of course has the advantage of giving a more favorable power factor.

Referring now to Fig. 4, in which the motor construction shown in Fig. 1 obtains, the windings 11 and 12 of the motor 10 are connected across the line 30, and their common point of connection 31 is connected to the two phase modifiers 32 and 33, the former being connected by a wire 34 to a movable contact 35 shown in the form of an arm provided on a rotatable shaft 36 which carries a gear 37 geared to the motor shaft, designated as
38. When the motor coils are energized by connecting them across the line 30, the motor shaft 38 is rotated and this swings the pointer 35 along a potentiometer resistance 40 which is connected across the line as shown. The second phase modifier 33 is connected to another pointer 41 which operates across a potentiometer resistance 42 connected across the line 30 and adapted to be manually controlled from a point which may be quite remote from the motor itself. When the control pointer 41 and the motor controlled pointer 35 are at the middle points of their potentiometer resistances the currents flowing in the two windings 12 and 11 will be exactly equal and the phase modifying effect of the devices 32 and 33 will be absent since they are balanced across the line. The motor will therefore stand at rest as the two windings, being of similar design and construction will balance each other. Assume, however, that the manually controlled pointer 41 is moved to the dotted line position indicated in Fig. 4. This will immediately unbalance the currents flowing in the two windings 11 and 12, and unbalance the connections to the condensers or phase modifiers 32 and 33 so that the motor will immediately start operation and it will move the pointer 35 to tend to balance the system again, the motor shaft 38 causing the rotation of the pointer 35 until it reaches its dotted line position shown, at which time the system will again be balanced and the motor will stop. Movement of the control pointer 41 from the dotted line position towards one side will cause rotation of the motor in one direction, and movement towards the other side will cause rotation of the motor in the opposite direction. If the control pointer 41 is moved all the way over so as to contact with one side of the line the motor will operate with its maximum torque and speed and continue operation until the motor controlled pointer 35 is moved to contact with the opposite side of the line at which time the motor will stop. This forms a very convenient system for the remote control of a motor of this sort in which reversibility and exact stopping points are a factor, and the motor and its control can be very effectively used for the remote operation of radio tuning devices or a great number of other uses.

To provide for a comparatively strong starting torque when a movement of the pointer contact 41 takes place two spring contacts 51 and 52 are provided which will instantly and temporarily connect the pointer to one side of the line or the other depending on the direction of movement of pointer 41. A suitable spring 53 or the like may be employed to connect the hub 54 carrying the contacts 51 and 52, to the control knob 50 to normally position the contacts 51 and 52 suitably spaced from the pointer 41. During the manual movement of the pointer 41, however, it moves over against one of the contacts to create a substantial unbalancing of the phase displacing means, the contact 51 or 52 moving away from the pointer 41 again when movement of the pointer 41 stops.

Fig. 5 shows a slightly modified arrangement of the electrical connections, the windings 11 and 12 of the motor being connected, as shown, to the phase modifier 44, the switch 45 and the line 46. The rotor shaft 38 is connected by suitable gears to a driven shaft 47 which carries a cam 48 which can operate on the contact carrying arm 49 to break the circuit from one side of the line through the winding 12 and cause a closure of the circuit from that side of the line through the winding 11, the phase modifier 44 being simultaneously switched from one side to the other so that the operation of the motor can be readily reversed after the motor has operated a predetermined number of revolutions. It will be understood that the motor will operate in one direction when current is supplied through the line 46 to cause rotation of the cam shaft through part of one revolution or until the cam moves the contact carrying arm 49, when the direction of motor rotation will be automatically reversed. Operation of the contact carrying arm 49 is effected through a toggle system including the bifurcated arm 56 pivotally mounted at 57, and the lever 58 also pivoted at 57 and operably connected to the arm 56 by means of a spring 59. The spring 59 holds the parts in whichever position they have been moved by the cam until the cam again swings the bifurcated arm 56, at which time the spring 59 will snap the lever 58 and move the arm 49 to change the connections. The contacts are kept closed until they are positively changed by action of the cam 48.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a motor of the class described, a plurality of exciting windings connected in series across the supply circuit and each including a series of poles, the poles being embraced in pairs by the coils of one winding and the two poles of a pair also embraced by different coils of the other winding, the windings having pole pieces in common and adjacent coils of a winding being reversely wound so as to provide a strong and a weak pole of similar polarity adjacent one another, and a phase modifier for one of said windings, the windings producing fluxes in adjacent poles at substantially 90° phase displacement.

2. A motor of the class described comprising a plurality of exciting windings having common pole pieces, the poles being embraced in pairs by the coils of one winding and the two poles of a pair being also embraced by different coils of the other winding, a phase modifier connected on one side to each of said windings, the other side of said windings being adapted to be connected across the line, and a single member for opening the circuit through said phase modifier to stop the motor and for selectively connecting said phase modifier to either side of the line for causing operation of the motor in either direction.

3. In combination, an electric motor comprising a plurality of windings having pole pieces in common, each pair of poles being embraced by one coil of one winding and the two poles of each pair being also embraced by different coils of the other winding, phase modifying means connected on one side to said windings, the other side of said windings being adapted to be connected across the line, means connected across the line and having an adjustable connection to said phase modifying means, means operated by said motor for adjusting said connection, and a control means connected across the line having an adjustable device connected to said phase modifying means for controlling the operation of the motor.

4. In combination, an electric motor comprising a plurality of windings similar in construction and having common pole pieces, the poles being embraced in pairs by the coils of one winding and the two poles of a pair being also embraced by different coils of the other winding, a phase modifier connected to each of said windings, said windings being adapted to be connected across the line, means connected across the line and having an adjustable member connected to said phase modifier, means operated by said motor for moving said adjustable member, a second phase modifier connected to said windings, and a second means connected across the line and having a manually adjustable connection connected to said second phase modifier for controlling the operation of said motor.

5. In a motor of the class described, a plurality of exciting windings of substantially similar characteristics and both adapted to be simultaneously energized in series across a single phase alternating current supply, the windings having pole pieces in common, the pole pieces being embraced in pairs by the coils of one winding and the two poles of each of said pairs being also embraced by different coils of the other winding to provide a strong and a weak pole of similar polarity adjacent one another, a phase modifier connected to one side of each of said windings, and means for selectively connecting said phase modifier to either side of the line to cause operation of the motor in either direction.

6. In combination, a reversible alternating current motor comprising a plurality of windings adapted for connection in series to a single phase alternating current source of substantially constant frequency, poles embraced in pairs by the coils of one winding and the two poles of a pair being embraced by different coils of the other winding, a phase modifier, connections from said phase modifier to the windings, means operated by said motor for gradually modifying said connections while the frequency and voltage of said source remains constant to render said phase modifier ineffective and stop the motor, and a manual control for directly varying the effect of said phase modifier.

ORIN E. MARVEL.